US012802650B2

(12) United States Patent
Lee et al.

(10) Patent No.: US 12,802,650 B2
(45) Date of Patent: Nov. 17, 2026

(54) DISPLAY DEVICE HAVING A CONTROL CIRCUIT BOARD WITH A DIGITAL-ANALOG CONVERTER FOR VARYING OUTPUT POWER VOLTAGE

(71) Applicant: Samsung Display Co., Ltd., Yongin-si (KR)

(72) Inventors: Dae-Sik Lee, Yongin-si (KR); Siduk Sung, Yongin-si (KR); Songyi Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/659,694

(22) Filed: May 9, 2024

(65) Prior Publication Data

US 2024/0290286 A1 Aug. 29, 2024

Related U.S. Application Data

(63) Continuation of application No. 18/099,451, filed on Jan. 20, 2023, now Pat. No. 12,008,966.

(30) Foreign Application Priority Data

Apr. 25, 2022 (KR) ........................ 10-2022-0050566

(51) Int. Cl.
*G09G 3/3275* (2016.01)

(52) U.S. Cl.
CPC ..... *G09G 3/3275* (2013.01); *G09G 2310/027* (2013.01); *G09G 2330/021* (2013.01)

(58) Field of Classification Search
CPC .................................................... G09G 3/3275
USPC .......................................................... 345/204
See application file for complete search history.

(56) References Cited

U.S. PATENT DOCUMENTS 9,093,022 B2 7/2015 Choi
9,489,892 B2 11/2016 Lee et al.
10,325,552 B2 6/2019 Jeong et al.
2013/0063498 A1* 3/2013 Yabukane ............ G09G 3/3225 345/77
2013/0207954 A1 8/2013 Choi
2014/0362124 A1* 12/2014 Kim ..................... G09G 3/3233 345/77
2015/0243211 A1 8/2015 Pyo
(Continued)

FOREIGN PATENT DOCUMENTS

KR 101969830 B1 8/2019
KR 102028047 B1 10/2019
(Continued)

*Primary Examiner* — Long D Pham
(74) *Attorney, Agent, or Firm* — CANTOR COLBURN LLP

(57) ABSTRACT

A display device includes a display panel which displays an image, and a control circuit board connected to the display panel. The control circuit board includes a controller which analyzes the image in real time and determines in real time a digital-type power voltage based on the image, and a voltage generator which generates an analog-type power voltage based on the digital-type power voltage received from the controller. The voltage generator includes a digital-analog converter which converts the digital-type power voltage into the analog-type power voltage and outputs the analog-type power voltage.

16 Claims, 9 Drawing Sheets

(56) References Cited

U.S. PATENT DOCUMENTS

| | | | | |
|---|---|---|---|---|
| 2016/0293107 | A1 | 10/2016 | Jeong | |
| 2017/0098409 | A1* | 4/2017 | Heo | G09G 3/3266 |
| 2022/0215803 | A1* | 7/2022 | Pyun | G09G 3/20 |

FOREIGN PATENT DOCUMENTS

| | | | |
|---|---|---|---|
| KR | 102074719 | B1 | 2/2020 |
| KR | 102205798 | B1 | 1/2021 |

* cited by examiner

DISPLAY DEVICE HAVING A CONTROL CIRCUIT BOARD WITH A DIGITAL-ANALOG CONVERTER FOR VARYING OUTPUT POWER VOLTAGE

This application is a continuation of U.S. patent application Ser. No. 18/099,451, filed on Jan. 20, 2023, which claims priority to Korean Patent Application No. 10-2022-0050566, filed on Apr. 25, 2022, and all the benefits accruing therefrom under 35 U.S.C. § 119, the content of which in its entirety is herein incorporated by reference.

BACKGROUND

1. Field

Embodiments of the invention relate to a display device, and more particularly, to a display device with reduced consumption power.

2. Description of the Related Art

There have been developed a variety of display devices used for multimedia apparatuses such as televisions, mobile phones, tablet computers, navigation systems, and game consoles.

Such display devices have been used in various fields, and thus there are various kinds of display panel for representing images shown on display devices.

Recently, the display panel may include an emissive display panel, and the emissive display panel may include an organic light-emitting display panel or a quantum-dot light-emitting display panel.

SUMMARY

An embodiment of the invention provides a display device definitely implemented to reduce consumption power and to vary in real time a power voltage that is output in consideration of magnitude of a power voltage used based on an input image.

According to an embodiment of the invention, a display device includes: a display panel that displays an image; and a control circuit board connected to the display panel. In such an embodiment, the control circuit board includes: a controller which analyzes the image in real time and determines in real time a digital-type power voltage based on the image; and a voltage generator which generates an analog-type power voltage based on the digital-type power voltage received from the controller. The voltage generator includes a digital-analog converter which converts the digital-type power voltage into the analog-type power voltage and outputs the analog-type power voltage.

In an embodiment, the control circuit board may further include a voltage converter which generates an output power voltage based on the analog-type power voltage received from the voltage generator.

In an embodiment, the control circuit board may output the output power voltage varied in real time based on the image and applies the output power voltage to the display panel.

In an embodiment, the voltage converter may use a voltage distribution manner to generate the output power voltage based on the analog-type power voltage.

In an embodiment, the digital-analog converter may include: a voltage range setting part which sets a voltage range in which the analog-type power voltage is determined; and a conversion part which generates the analog-type power voltage within the voltage range, based on a digital signal of the digital-type power voltage.

In an embodiment, the voltage range setting part may determine a voltage variation of the analog-type power voltage within the voltage range to be varied in response to a variation in one step of gray scale of the image, where the voltage variation may have a constant value.

In an embodiment, the digital signal of the digital-type power voltage may be varied in real time based on the gray scale for the image. In such an embodiment, the conversion part may generate the analog-type power voltage which is varied in real time based on the digital signal of the digital-type power voltage which is varied in real time.

In an embodiment, a magnitude of the gray scale for the image may be in proportion to a magnitude of the analog-type power voltage which is output from the conversion part.

In an embodiment, the controller may determine the digital-type power voltage based on gray scale for the image.

In an embodiment, a magnitude of the analog-type power voltage may be in proportion to a magnitude of the gray scale.

According to an embodiment of the invention, a display device includes: a display panel which displays an image varied in real time; and a control circuit board connected to the display panel. In such an embodiment, the control circuit board includes: a controller which analyzes the image in real time and determines in real time a digital-type power voltage based on gray scale for the image; a voltage generator which generates an analog-type power voltage based on the digital-type power voltage received from the controller; and a voltage converter which generates an output power voltage based on the analog-type power voltage received from the voltage generator. In such an embodiment, the voltage generator includes a digital-analog converter which converts a digital signal of the digital-type power voltage into the analog-type power voltage.

In an embodiment, the control circuit board may further include a voltage distribution circuit connected to the voltage converter. In such an embodiment, the voltage distribution circuit may receive the analog-type power voltage, calculate a distribution voltage for generating the output power voltage, and transmit the calculated distribution voltage to the voltage converter.

In an embodiment, the voltage converter may generate the output power voltage varied in real time based on the analog-type power voltage and may output the output power voltage to the display panel.

In an embodiment, a magnitude of the output power voltage may be inverse proportion to a magnitude of the analog-type power voltage.

In an embodiment, the digital-analog converter may include: a voltage range setting part which sets a voltage range of the analog-type power voltage; and a conversion part which generates the analog-type power voltage to be within the voltage range in real time based on the digital signal of the digital-type power voltage.

In an embodiment, a magnitude of the gray scale for the image may be in proportion to a magnitude of the analog-type power voltage which is output from the conversion part.

In an embodiment, a maximum voltage magnitude of the analog-type power voltage may be determined as one selected from about 1.8 V, about 3.3 V, and about 4.8 V.

In an embodiment, the voltage range setting part may determine a voltage variation of the analog-type power voltage within the voltage range to be varied in response to a variation in one step of the ray scale of the image, where the voltage variation may have a constant value.

In an embodiment, the controller may be connected to the voltage converter and control a generation of the output power voltage.

In an embodiment, a magnitude of the analog-type power voltage which is output from the digital-analog converter may be in proportion to a magnitude of the gray scale for the image.

DETAILED DESCRIPTION

Figure 1:
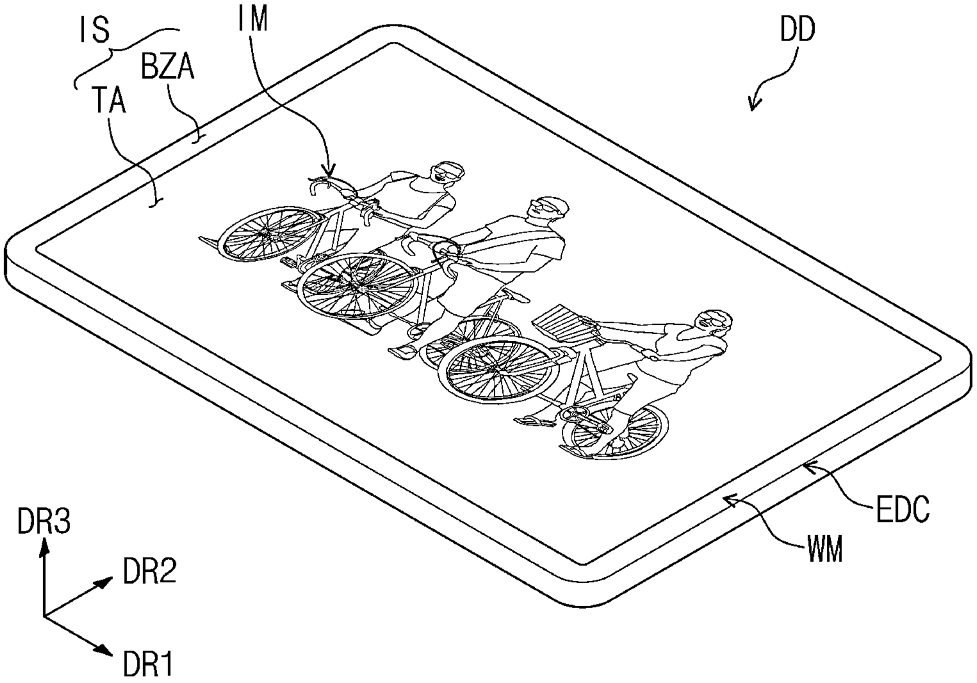
FIG. 1 illustrates a perspective view showing a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this description, when a certain component (or region, layer, portion, etc.) is referred to as being "on", "connected to", or "coupled to" other component(s), the certain component may be directly disposed on, directly connected to, or directly coupled to the other component(s) or at least one intervening component may be therebetween.

Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
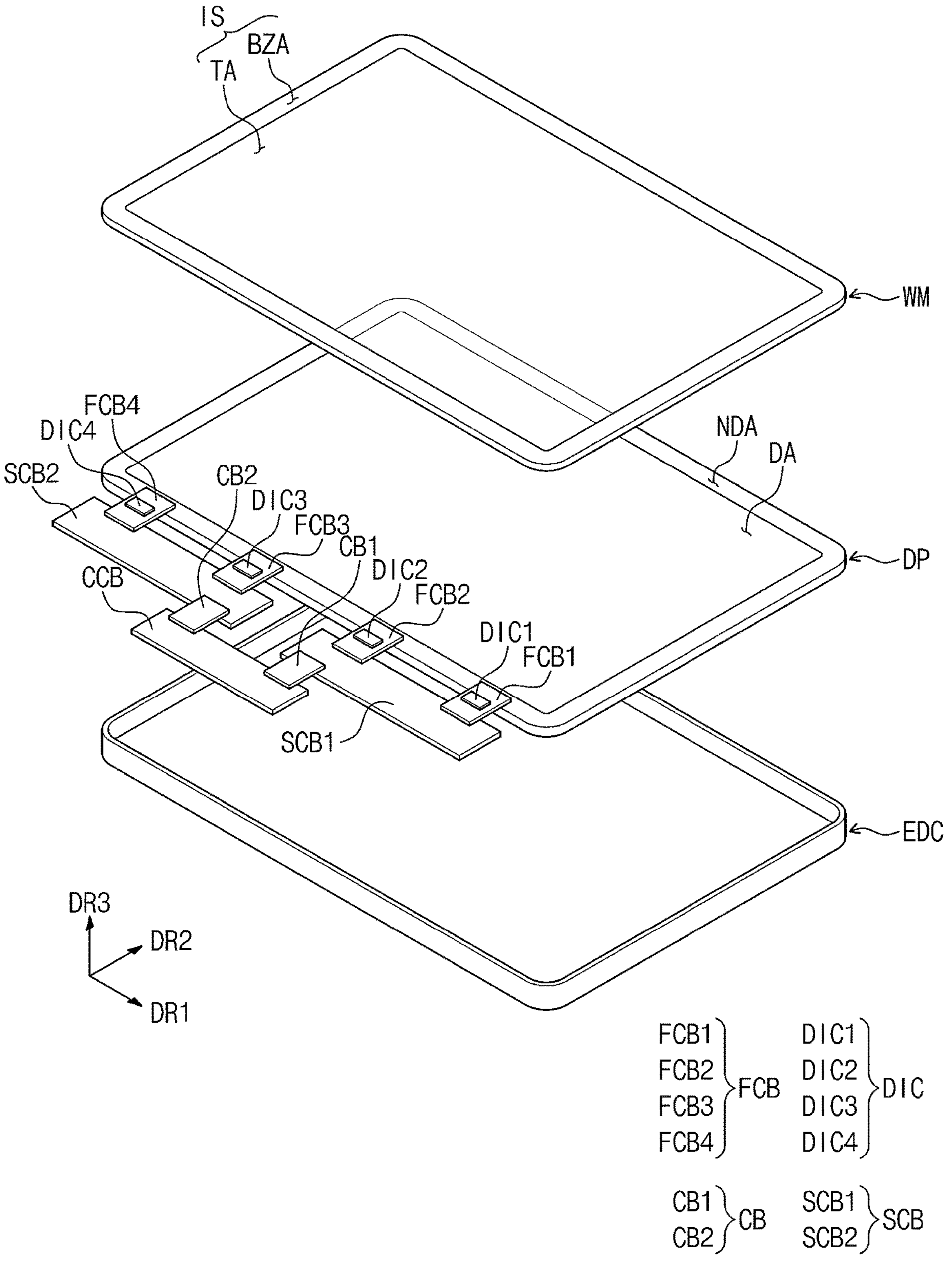
FIG. 2 illustrates an exploded perspective view showing a display device according to an embodiment of the invention.

FIG. 1 illustrates a perspective view showing a display device according to an embodiment of the invention. FIG. 2 illustrates an exploded perspective view showing a display device according to an embodiment of the invention.

Referring to FIGS. 1 and 2, an embodiment of a display device DD may be an apparatus that is activated by electric signals. The display device DD may be applicable not only to large-sized electronic products such as television sets and monitors, but to small and medium-sized electronic products such as mobile phones, tablet personal computers (PCs), automotive navigation systems, and game consoles. These products are merely examples, and the display device DD may be adopted for any suitable electronic apparatus unless departing from the teachings therein. FIG. 1 shows an embodiment where display device DD is a television (TV)-like shaped display device, but the invention is not limited thereto.

The display device DD has a rectangular shape having a long side in a first direction DR1 and a short side in a second direction DR2 that intersects the first direction DR1. The shape of the display device DD may be variously changed without being limited thereto. The display device DD may display an image IM in a third direction DR3 on a display surface IS parallel to each of the first direction DR1 and the second direction DR2. The display surface IS that displays the image IM may correspond to a front surface of the display device DD.

In an embodiment, front and rear surfaces (or top and bottom surfaces) of each component are defined based on a direction along which the image IM is displayed. The front and rear surfaces may be opposite to each other in the third direction DR3, and a normal direction to each of the front and rear surfaces may be parallel to the third direction DR3 or a thickness direction of the display device DD.

An interval in the third direction DR3 between the front and rear surfaces may correspond to a thickness in the third direction DR3 of the display device DD. Directions indicated by the first, second, and third directions DR1, DR2, and DR3 are relative concepts and may denote other directions.

The display device DD may detect an external input that is externally applied. The external input may include any suitable types of input that is applied from outside the display device DD. The display device DD according to an embodiment of the invention may detect a user's input that is externally applied. The external input may include a user's body, light, heat, pressure, or any various type inputs. In addition, depending on a structure of the display device DD, the display device DD may detect a user's input that is applied to a lateral or rear surface of the display device DD, but the invention is not limited to a particular embodiment.

The display device DD according to an embodiment of the invention may detect not only external inputs from users, but inputs from input apparatuses (e.g., stylus pen, active pen, touch pen, electronic pen, and so forth).

The front surface of the display device DD may be classified into a transmission area TA and a bezel area BZA. The transmission area TA may be a zone on which the image IM is displayed. A user recognizes the image IM through the transmission area TA. In an embodiment, the transmission area TA is illustrated as being of a rectangular shape with rounded vertices. This, however, is illustrated by way of example, and the transmission area TA may have various shapes without being limited to a particular embodiment.

The bezel area BZA is adjacent to the transmission area TA. The bezel area BZA may have a certain color. The bezel area BZA may surround the transmission area TA. Therefore, the bezel area BZA may substantially define the shape of the transmission area TA. This, however, is illustrated by way of example, and the bezel area BZA may be disposed to adjoin only one side of the transmission area TA or may be omitted. The display device DD according to an embodiment of the invention may include diverse embodiments, and is not limited to a particular embodiment.

In an embodiment, as shown in FIG. 2, the display device DD may include a window WM, a display panel DP, and an outer casing EDC.

The window WM may include or be formed of a transparent material capable of emitting the image IM. In an embodiment, for example, the window WM may include glass, sapphire, plastic, or the like. The window WM is illustrated as a single layer, but the invention is not limited thereto, and the window WM may include a plurality of layers.

Although not shown, the bezel area BZA of the display device DD may be provided substantially as a section where a certain colored material is printed on a region of the window WM. In an embodiment of the invention, the window WM may include a light-shield pattern to define the bezel area BZA. The light-shield pattern may be a colored organic layer formed by, for example, a coating method.

The window WM may be coupled to the display panel DP through an adhesive film. In an embodiment of the invention, the adhesive film may include an optically clear adhesive film (OCA). The adhesive film, however, is not limited thereto, and may include an ordinary adhesive or glue. In an embodiment, for example, the adhesive film may include an optically clear resin (OCR) or a pressure sensitive adhesive film (PSA).

An antireflective layer may further be disposed between the window WM and the display panel DP. The antireflective layer reduces a reflectance of external light that is incident from above the window WM. The antireflective layer according to an embodiment of the invention may include a retarder and a polarizer. The retarder may be of a film type or a liquid crystal coating type, and may include a λ/2 retarder and/or a λ/4 retarder. The polarizer may also be of a film type or a liquid crystal coating type. The film type may include a stretchable synthetic resin film, and the liquid crystal coating type may include arrayed liquid crystals. The retarder and the polarizer may collectively define a single polarizing film.

In an embodiment of the invention, the antireflective layer may include color filters. An arrangement of the color filters may be determined in consideration of colors of light produced from a plurality of pixels (see PX of FIG. 3) included in the display panel DP. The antireflective layer may further include a light-shield pattern.

The display panel DP may include a display area DA on which the image IM is displayed and a non-display area NDA adjacent to the display area DA. The display area DA may be a region that emits the image IM provided from the display panel DP. The non-display area NDA may surround the display area DA. This, however, is illustrated by way of example, and non-display area NDA may be defined as various shapes without being limited to a particular embodiment. In an alternative embodiment, for example, the non-display area NDA may be provided to adjoin one side or opposite sides of the display area DA. According to an embodiment, the display area DA of the display device DD may correspond to at least a portion of the transmission area TA, and the non-display area NDA of the display device DD may correspond to the bezel area BZA.

The display panel DP according to an embodiment of the invention may be an emissive display panel. in an embodiment, for example, the display panel DP may be an organic light-emitting display panel, an inorganic light-emitting display panel, or a quantum-dot light-emitting display panel. An emission layer of the organic light-emitting display panel may include an organic light-emitting material. An emission layer of the inorganic light-emitting display panel may include an inorganic light-emitting material. An emission layer of the quantum-dot light-emitting display panel may include a quantum-dot or a quantum-rod. Hereinafter, for convenience of description, embodiments where the display panel DP is an organic light-emitting display panel will be described in detail.

In an embodiment of the invention, the display device DD may further include an input sensing layer that detects an external input (e.g., touch event). The input sensing layer may be directly disposed on the display panel DP. According to an embodiment of the invention, the input sensing layer may be formed by a successive process. In an embodiment, for example, where the input sensing layer is directly disposed on the display panel DP, no adhesive film may be placed between the input sensing layer and the display panel DP. The invention, however, is not limited thereto. Alternatively, an adhesive film may be disposed between the input sensing layer and the display panel DP. In such an embodiment, the input sensing layer and the display panel DP may not be fabricated in a successive process, but after the input sensing layer is fabricated in a separate process from that of the display panel DP, the input sensing layer may be fixed through the adhesive film to a top surface of the display panel DP.

The display device DD may further include a first circuit board SCB, a second circuit board CCB, a plurality of connection board CB, a plurality of flexible circuit films FCB, and a plurality of driver chips DIC. The plurality of connection boards CB may be called a plurality of connectors (referred to hereinafter as the plurality of connectors CB).

The first circuit board SCB may be called a source circuit board (referred to hereinafter as the source circuit board SCB). A plurality of source circuit boards SCB may be connected to the flexible circuit films FCB to come into electrical connection with the display panel DP. The flexible circuit films FCB are connected to the display panel DP to thereby electrically connect the display panel DP to the source circuit boards SCB.

The second circuit board CCB may be called a control circuit board (referred to hereinafter as the control circuit board CCB). The control circuit board CCB may be connected to the connectors CB to come into electrical connection with the source circuit boards SCB. The control circuit board CCB may be electrically connected to the display panel DP through the connectors CB, the source circuit boards SCB, and the flexible circuit films FCB.

The control circuit board CCB and the source circuit boards SCB may include a plurality of driver elements. The driver elements may include a circuit for driving the display panel DP. The driver chips DIC may be mounted on the flexible circuit films FCB.

In an embodiment of the invention, the source circuit boards SCB may include a first source circuit board SCB1 and a second source circuit board SCB2. The connectors CB may include a first connector CB1 and a second connector CB2. The flexible circuit films FCB may include a first flexible circuit film FCB1, a second flexible circuit film FCB2, a third flexible circuit film FCB3, and a fourth flexible circuit film FCB4. The driver chips DIC may include a first driver chip DIC1, a second driver chip DIC2, a third driver chip DIC3, and a fourth driver chip DIC4.

The first source circuit board SCB1 and the second source circuit board SCB2 may be disposed spaced apart from each other in the first direction DR1. The control circuit board CCB may be electrically connected through the first connector CB1 to the first source circuit board SCB1. The control circuit board CCB may be electrically connected through the second connector CB2 to the second source circuit board SCB2.

The first connector CB1 may be referred to as a first connection board CB1. The second connector CB2 may be referred to as a second connection board CB2. The first connection board CB1 and the second connection board CB2 may each be a flexible flat cable. The flexible flat cables may connect the source circuit boards SCB to the control circuit board CCB. In an embodiment, the first connector CB1 and the second connector CB2 may each be a fastening part of the flexible flat cable.

In an embodiment, the first connector CB1 and the second connector CB2 may be flexible flat cables each including a fastening part.

The first and second flexible circuit films FCB1 and FCB2 may be disposed spaced apart from each other in the first direction DR1, and may be connected to the display panel DP to thereby electrically connect the display panel DP to the first source circuit board SCB1. The first driver chip DIC1 may be mounted on the first flexible circuit film FCB1. The second driver chip DIC2 may be mounted on the second flexible circuit film FCB2.

The third and fourth flexible circuit films FCB3 and FCB4 may be disposed spaced apart from each other in the first direction DR1, and may be connected to the display panel DP to thereby electrically connect the display panel DP to the second source circuit board SCB2. The third driver chip DIC3 may be mounted on the third flexible circuit film FCB3. The fourth driver chip DIC4 may be mounted on the fourth flexible circuit film FCB4.

The invention, however, is not limited thereto. In an alternative embodiment, for example, the source circuit boards SCB may include at least three source circuit boards. In such an embodiment, the control circuit board CCB may be electrically connected to three or more source circuit boards. In addition, the connectors CB may include at least three connectors. In an embodiment of the invention, where the connectors CB include four connectors, the control circuit board CCB may be electrically connected through two connectors to each of the first and second source circuit boards SCB1 and SCB2. In an embodiment, four source circuit boards may be provided. In such an embodiment, a third source circuit board may be connected through a flexible circuit film to the first source circuit board SCB1, and a fourth source circuit board may be connected through a flexible circuit film to the second source circuit board SCB2.

The outer casing EDC and the window WM may be connected to each other to define an appearance of the display device DD. The outer casing EDC absorbs externally applied impact and prevents the display panel DP from receiving foreign substances and moisture, thereby protecting components accommodated in the outer casing EDC. In an embodiment of the invention, the outer casing EDC may have a structure in which a plurality of receiving members is connected to each other.

The display device DD according to an embodiment may further include an electronic module that includes various functional modules for driving the display panel DP, a power supply module that supplies a power to be used for the display device DD, and a bracket that is coupled to the outer casing EDC to thereby divide an inner space of the display device DD.

Figure 3:
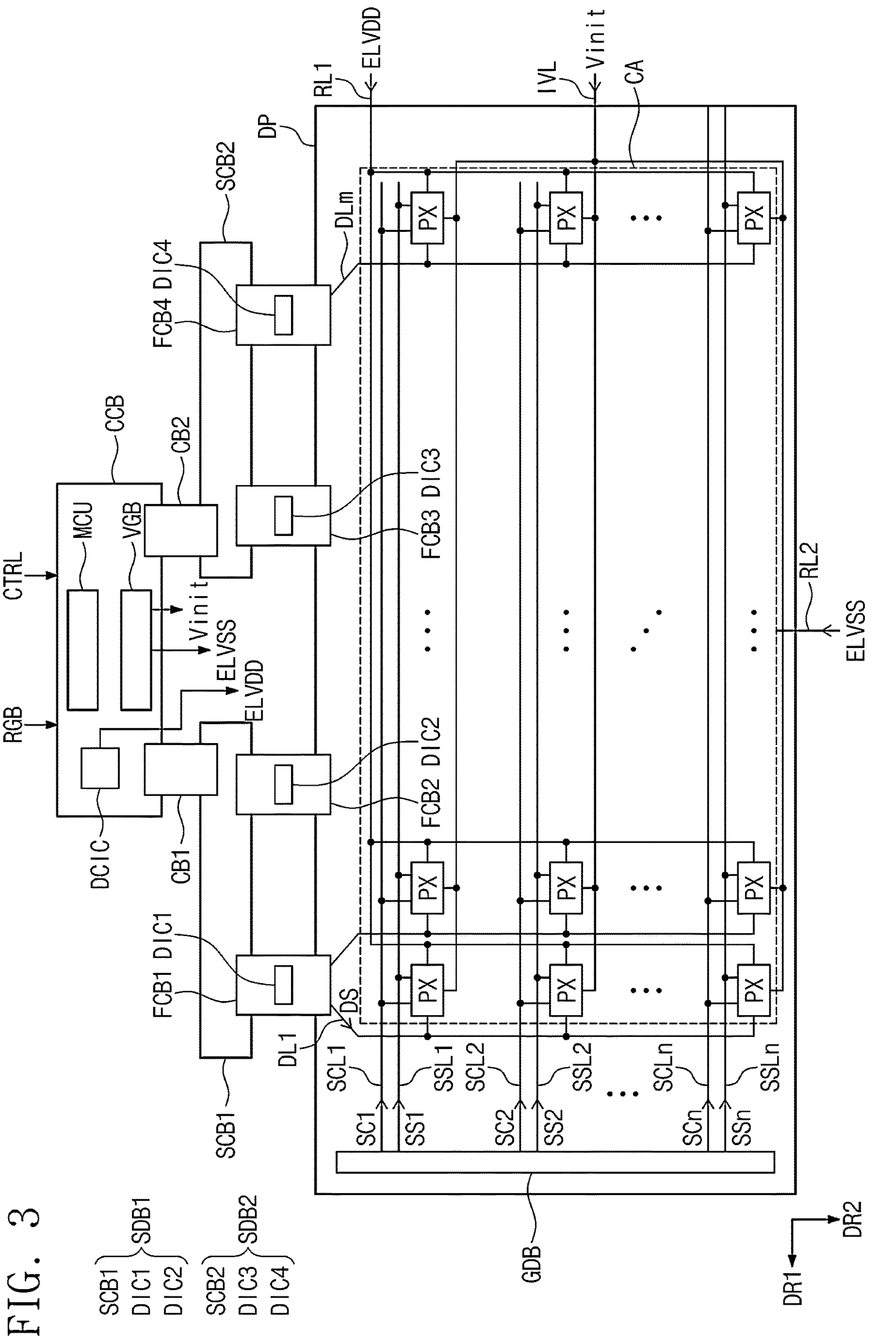
FIG. 3 illustrates a block diagram showing a display device according to an embodiment of the invention.

FIG. 3 illustrates a block diagram showing a display device according to an embodiment of the invention. Hereinafter, the same reference numerals are allocated to the same components as those described above with reference to FIG. 2, and any repetitive detailed description thereof will be omitted.

Referring to FIG. 3, an embodiment of the display device DD includes a display panel DP, a control circuit board CCB, a first source circuit board SCB1, a second source circuit board SCB2, a gate driver block GDB, a first connector CB1, a second connector CB2, first to fourth flexible circuit films FCB1 to FCB4, first to fourth driver chips DIC1 to DIC4, a voltage generator VGB, a voltage converter DCIC, and a controller MCU.

In an embodiment of the invention, the control circuit board CCB receives a video signal RGB and an external control signal CTRL from an outside. The external control signal CTRL may include a vertical synchronizing signal, a horizontal synchronizing signal, a main clock, and so forth. The control circuit board CCB generates an image data by converting a data format of the video signal RGB to meet an interface specification with the first and second source circuit boards SCB1 and SCB2 and the first to fourth driver chips DIC1 to DIC4. For convenience of description below, a first source driver SDB1 is defined to indicate a configuration including the first source circuit board SCB1 and the first and second driver chips DIC1 and DIC2. In addition, a second source driver SDB2 is defined to indicate a configuration including the second source circuit board SCB2 and the third and fourth driver chips DIC3 and DIC4. Based on the external control signal CTRL, the control circuit board CCB generates a control signal. The control signal includes a source control signal and a gate control signal.

The control circuit board CCB provides the first and second source drivers SDB1 and SDB2 with the image data and the source control signal. The source control signal may include a horizontal start signal that starts an operation of the first and second source drivers SDB1 and SDB2. In response to the source control signal, the first and second source drivers SDB1 and SDB2 generate data signals DS based on the image data. The first and second source drivers SDB1 and SDB2 output the data signals DS to a plurality of data lines DL1 to DLm which will be described below. The data signal DS is an analog voltage that corresponds to a grayscale value of the image data.

The gate driver block GDB receives a gate control signal from the control circuit board CCB. The gate control signal may include a vertical start signal that starts an operation of the gate driver block GDB, scan signals SC1 to SCn, and a scan clock signal that determines the time when initialization signals SS1 to SSn are output. Based on the gate control signal, the gate driver block GDB generates the scan signals SC1 to SCn and the initialization signals SS1 to SSn. The gate driver block GDB sequentially outputs the scan signals SC1 to SCn to a plurality of scan lines SCL1 to SCLn which will be described below, and sequentially outputs the initialization signals SS1 to SSn to a plurality of initialization lines SSL1 to SSLn which will be described below.

The control circuit board CCB may include the voltage generator VGB and the voltage converter DCIC. The voltage generator VGB generates voltages used for an operation of the display panel DP. The voltage converter DCIC may be connected to the voltage generator VGB to thereby generate a first power voltage ELVDD.

In an embodiment of the invention, the voltage generator VGB generates a second power voltage ELVSS and an initialization voltage Vinit. In an embodiment of the invention, the first power voltage ELVDD has a voltage level greater than that of the second power voltage ELVSS. In an embodiment of the invention, the first power voltage ELVDD may have a voltage level in a range of about 12 volts (V) to about 28 V. The initialization voltage Vinit has a voltage level less than that of the second power voltage ELVSS. In an embodiment of the invention, the initialization voltage Vinit may have a voltage level in a range of about 1 V to about 9 V.

The control circuit board CCB may include the controller MCU. The controller MCU may generate various drive commands for an operation of the display panel DP. In an embodiment, for example, the controller MCU may generate a drive command that controls on/off of the display panel DP.

The controller MCU may apply a command not only to the display panel DP, but to the voltage generator VGB. The controller MCU may generate a command that controls on/off the voltage generator VGB.

In an embodiment of the invention, the display panel DP includes a plurality of scan lines SCL1 to SCLn, a plurality of initialization lines SSL1 to SSLn, a plurality of data lines DL1 to DLm, and a plurality of pixels PX. The scan lines SCL1 to SCLn and the initialization lines SSL1 to SSLn extend from the gate driver block GDB in a direction opposite to the first direction DR1, and are arranged spaced apart from each other in the second direction DR2. The data lines DL1 to DLm extend in the second direction DR2 from the first and second source drivers SDB1 and SDB2, and are arranged spaced apart from each other in the first direction DR1. Here, n and m are natural numbers.

Each of the plurality of pixels PX is electrically connected to a corresponding one of the scan lines SCL1 to SCLn and to a corresponding one of the initialization lines SSL1 to SSLn. In addition, each of the plurality of pixels PX is electrically connected to a corresponding one of the data lines DL1 to DLm.

Each of the plurality of pixels PX is electrically connected to a first power line RL1, a second power line RL2, and an initialization power line IVL. The first power line RL1 receives the first power voltage ELVDD from the voltage converter DCIC. The second power line RL2 receives the second power voltage ELVSS from the voltage generator VGB. The initialization power line IVL receives the initialization voltage Vinit from the voltage generator VGB. In an embodiment of the invention, a connection relationship between the pixels PX, the scan lines SCL1 to SCLn, the initialization lines SSL1 to SSLn, and the data lines DL1 to DLm may be changed or modified in accordance with a configuration of a driver circuit of the pixels PX.

The pixels PX may include a plurality of groups having organic light-emitting diodes that emit light of different colors from each other. In an embodiment, for example, the pixels PX may include red pixels that emit red colored light, green pixels that emit green colored light, and blue pixels that emit blue colored light. An organic light-emitting diode of the red pixel, an organic light-emitting diode of the green pixel, and an organic light-emitting diode of the blue pixel may include emission layers including different materials from each other. In an embodiment of the invention, each of the plurality of pixels PX may include white pixels that emit white colored light. In such an embodiment, an antireflective layer included in the display device DD may further include color filters. The display device DD may display the image (see IM of FIG. 1) based on light converted from white colored light by the color filters by passing therethrough. In an embodiment of the invention, the pixels PX may include or be formed of blue pixels that emit blue colored light. In such an embodiment, the display device DD may display the image (see IM of FIG. 1) light converted from blue colored light by the color filters by passing therethrough. In an embodiment of the invention, when a blue colored light passes through the color filters, the passed light may have color whose wavelength is different from that of the blue colored light. In an embodiment of the invention, the color filter may include a quantum dot. The quantum dot is a particle that can adjust a wavelength of emitted light by changing a wavelength of incident light. The wavelength of emitted light may be adjusted based on a size of the quantum dot, and thus the quantum dot may emit light having a red color, a green color ray, and/or a blue color.

An organic light-emitting diode included in each pixel PX may include a cathode CA. The cathode CA may be electrically connected to the second power line RL2 to thereby receive the second power voltage ELVSS from the voltage generator VGB. Alternatively, a plurality of cathodes CA included in the pixels PX may be integrally formed as a single unitary part to constitute a common cathode. In an embodiment of the invention, the common cathode may be formed to overlap two or more pixels.

Figure 4:
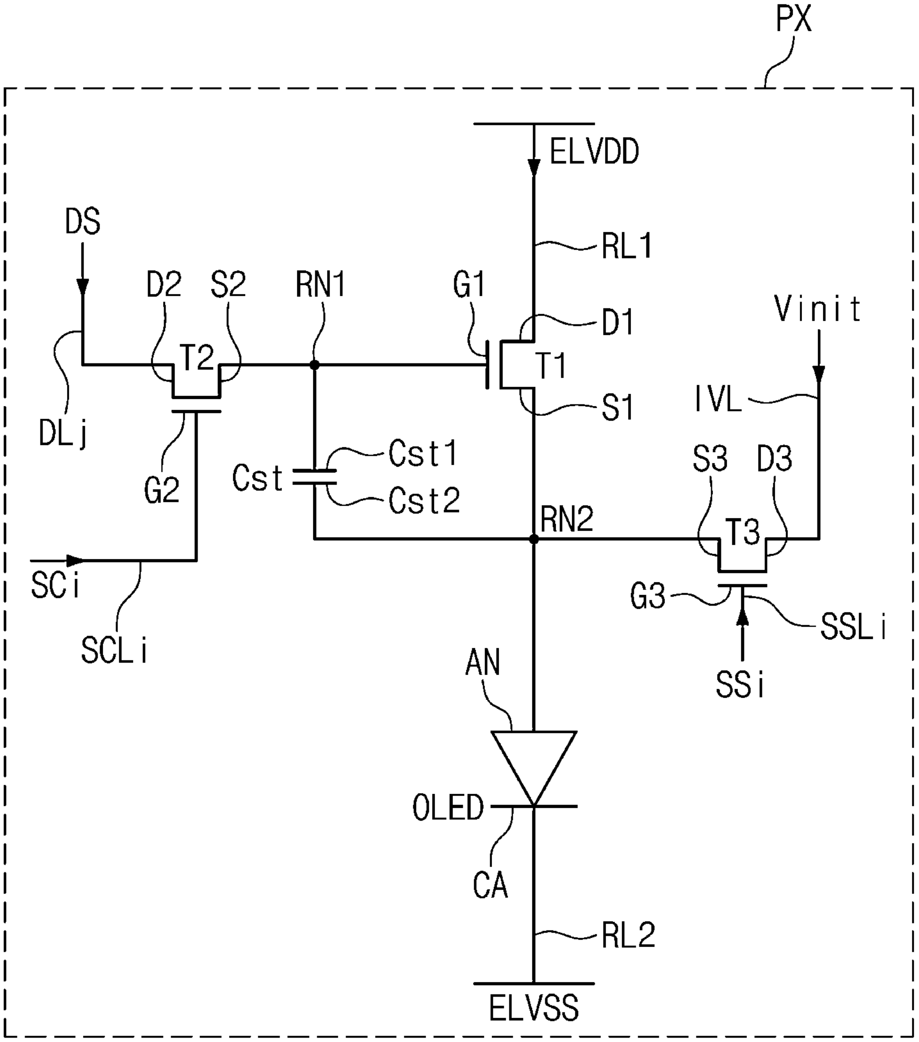
FIG. 4 illustrates an equivalent circuit diagram showing a pixel according to an embodiment of the invention.

FIG. 4 illustrates an equivalent circuit diagram showing a pixel according to an embodiment of the invention.

In an embodiment, the pixels PX may have a same circuit structure as each other. Referring to FIG. 4, an embodiment of a pixel PX connected to an $i^{th}$ scan line SCLi of the scan lines SCL1 to SCLn, an $i^{th}$ initialization line SSLi of the initialization lines SSL1 to SSLn, and a $j^{th}$ data line DLj of the data lines DL1 to DLm, among the pixels PX, will be described for convenience of description. Here, i is a natural number equal to or less than n, and j is a natural number equal to or less than m.

In an embodiment of the invention, the pixel PX may include first, second, and third transistors T1, T2, and T3, a capacitor Cst, and a light-emitting diode OLED. In an embodiment, each of the first, second, and third transistors T1, T2, and T3 may be an N-type transistor. The invention, however, is not limited thereto, and the first, second, and third transistors T1, T2, and T3 may be implemented as one of P-type and N-type transistors. In this description, the phrase "a transistor is couple to a signal line" means that "one of a source electrode, a drain electrode, and a gate electrode of the transistor is either integrally formed with the signal line to constitute a single unitary body or connected through a connection electrode to the signal line." In addition, the expression "a transistor is electrically connected to another transistor" means that "one of a source electrode, a drain electrode, and a gate electrode of the transistor is either integrally formed with one of a source electrode, a drain electrode, and a gate electrode of the another transistor to constitute a single unitary body or connected through a connection electrode to one of a source electrode, a drain electrode, and a gate electrode of the another transistor."

In an embodiment, the first transistor T1 may be a driver transistor, and the second transistor T2 may be a switching transistor. The third transistor T3 may be an initialization transistor. Hereinafter, each of the first to third transistors T1 to T3 includes a first electrode, a second electrode, a control electrode. The first electrode will be referred to as a source electrode, the second electrode will be referred to as a drain electrode, and the control electrode will be referred to as a gate electrode.

The first transistor T1 is connected to the first power line RL1 and the light-emitting diode OLED. A source electrode S1 of the first transistor T1 is electrically connected to an anode AN of the light-emitting diode OLED. A drain electrode D1 of the first transistor T1 is electrically connected to the first power line RL1. A gate electrode G1 of the first transistor T1 is electrically connected to a first reference node RN1. The first reference node RN1 may be electrically connected to a source electrode S2 of the second transistor T2. In an embodiment of the invention, the first power voltage ELVDD is transmitted through the first power line RL1 to the drain electrode D1 of the first transistor T1.

The second transistor T2 is connected between the $j^{th}$ data line DLj and the gate electrode G1 of the first transistor T1. The source electrode S2 of the second transistor T2 is electrically connected to the gate electrode G1 of the first transistor T1. A drain electrode D2 of the second transistor T2 is electrically connected to the $j^{th}$ data line DLj. A gate electrode G2 of the second transistor T2 is electrically connected to the $i^{th}$ scan line SCLi. In an embodiment of the invention, an $i^{th}$ scan signal SCi may be transmitted through the $i^{th}$ scan line SCLi to the gate electrode G2 of the second transistor T2. A data signal DS may be transmitted through the $j^{th}$ data line DLj to the drain electrode D2 of the second transistor T2.

The third transistor T3 is connected between a second reference node RN2 and the initialization power line IVL. A source electrode S3 of the third transistor T3 is electrically connected to the second reference node RN2. The second reference node RN2 may be electrically connected to a source electrode S1 of the first transistor T1. In addition, the second reference node RN2 may be electrically connected to the anode AN of the light-emitting diode OLED. A drain electrode D3 of the third transistor T3 is electrically connected to the initialization power line IVL. A gate electrode G3 of the third transistor T3 is electrically connected to the $i^{th}$ initialization line SSLi. In an embodiment of the invention, an $i^{th}$ initialization signal SSi may be transmitted through the $i^{th}$ initialization line SSLi to the gate electrode G3 of the third transistor T3. The initialization voltage Vinit may be transmitted through the initialization power line IVL to the drain electrode D3 of the third transistor T3.

The light-emitting diode OLED is connected between the second reference node RN2 and the second power line RL2. The anode AN of the light-emitting diode OLED is electrically connected to the second reference node RN2. The cathode CA of the light-emitting diode OLED is electrically connected to the second power line RL2.

The capacitor Cst is connected between the first reference node RN1 and the second reference node RN2. A first electrode Cst1 of the capacitor Cst may be electrically connected to the first reference node RN1, and a second electrode Cst2 of the capacitor Cst may be electrically connected to the second reference node RN2.

Referring to FIG. 3, the gate driver block GDB sequentially transmits the scan signals SC1 to SCn and the initialization signals SS1 to SSn to the display panel DP. The scan signals SC1 to SCn and the initialization signals SS1 to SSn may each have a high level for a certain period and a low level for a certain period. In this case, N-type transistors are turned on when corresponding signals have their high levels, and P-type transistors are turned on when corresponding signals have their low levels. Hereinafter, operation of the pixel PX including the N-type first, second, and third transistors will be described in detail.

When the $i^{th}$ initialization signal SSi has a high level, the third transistor T3 is turned on. When the third transistor T3 is turned on, the initialization signal Vinit is transmitted through the third transistor T3 to the second reference node RN2. Therefore, the second reference node RN2 is initialized to the initialization voltage Vinit, and the source electrode S1 of the first transistor T1 and the anode AN of the light-emitting diode OLED are also initialized to the initialization voltage Vinit, where the source electrode S1 and the anode AN are electrically connected to the second reference node RN2.

When the $i^{th}$ scan signal SCi has a high level, the second transistor T2 is turned on. When the second transistor T2 is turned on, the data signal DS is transmitted through the second transistor T2 to the first reference node RN1. Therefore, the data signal DS is also applied to the gate electrode G1 of the first transistor T1 and the first electrode Cst1 of the capacitor Cst, where the gate electrode G1 and the first electrode Cst1 are electrically connected to the first reference node RN1. When the data signal DS is applied to the gate electrode G1 of the first transistor T1, the first transistor T1 may be turned on.

In an embodiment of the invention, a period where the $i^{th}$ initialization signal SSi has a high level may overlap a period where the $i^{th}$ scan signal SCi has a high level. In this case, the data signal DS and the initialization voltage Vinit may be applied to opposite ends of the capacitor Cst, and the capacitor Cst may store charge that corresponds to a voltage difference between the opposite ends.

The second power voltage ELVSS is applied to the cathode CA of the light-emitting diode OLED. Thus, when the $i^{th}$ initialization signal SSi has a high level and thus the anode AN of the light-emitting diode OLED is provided with the initialization voltage Vinit whose voltage level is lower than that of the second power voltage ELVSS, no current flows through the light-emitting diode OLED.

When the $i^{th}$ scan signal SCi has a low level, the second transistor T2 is turned off. When the $i^{th}$ initialization signal SSi has a low level, the third transistor T3 is turned off. In an embodiment of the invention, a period where the $i^{th}$ scan signal SCi has a low level may overlap a period where the $i^{th}$ initialization signal SSi has a low level.

Even when the $i^{th}$ scan signal SCi has a low level and thus the second transistor is T2 turned off, the charge stored in the capacitor Cst allows the first transistor T1 to maintain its turn-on state. Therefore, a driving current flows through the first transistor T1. The driving current introduced through the first transistor T1 causes a gradual increase in voltage level of the anode AN of the light-emitting diode OLED. When a voltage level of the anode AN is greater than that of the cathode CA, the driving current flows to the light-emitting diode OLED, and light is emitted from the light-emitting diode OLED. In this case, even when the second reference node RN2 has an increased voltage level, a coupling effect of the capacitor Cst induces an increase in voltage level of the first reference node RN1, and thus the driving current flowing through the first transistor T1 may maintain its magnitude.

In an embodiment of the invention, referring to FIGS. 3 and 4, the voltage generator VGB and the voltage converter DCIC included in the control circuit board CCB provide the first power voltage ELVDD, the second power voltage ELVSS, and the initialization voltage Vinit through the first connector CB1 and the first source driver SDB1 to each pixel PX included in the display panel DP. In addition, the voltage generator VGB and the voltage converter DCIC included in the control circuit board CCB provide the first power voltage ELVDD, the second power voltage ELVSS, and the initialization voltage Vinit through the second connector CB2 and the second source driver SDB2 to each pixel PX included in the display panel DP.

Figure 5A:
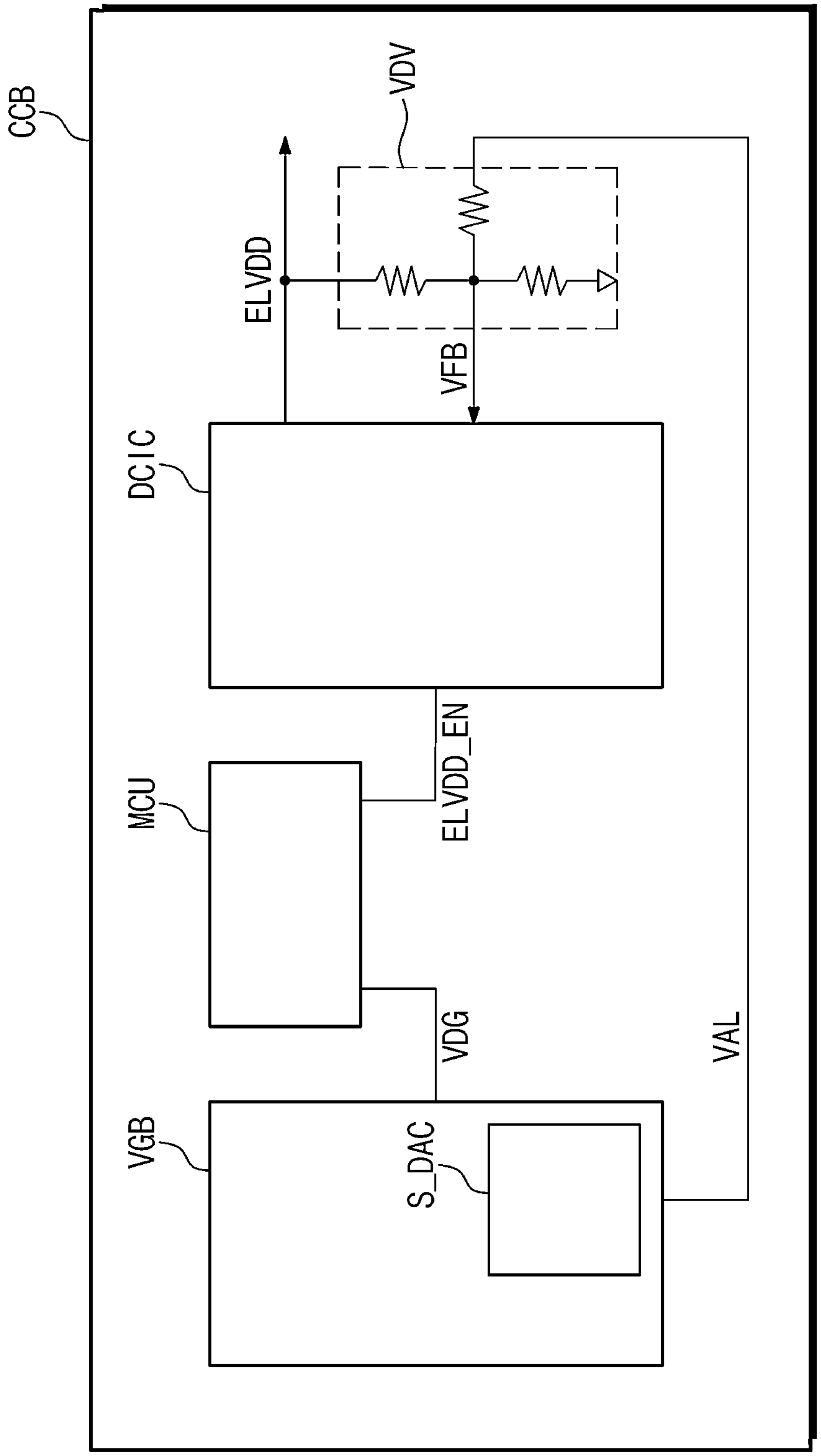
FIGS. 5A and 5B illustrate block diagrams showing a control circuit board according to an embodiment of the invention.
Figure 5B:
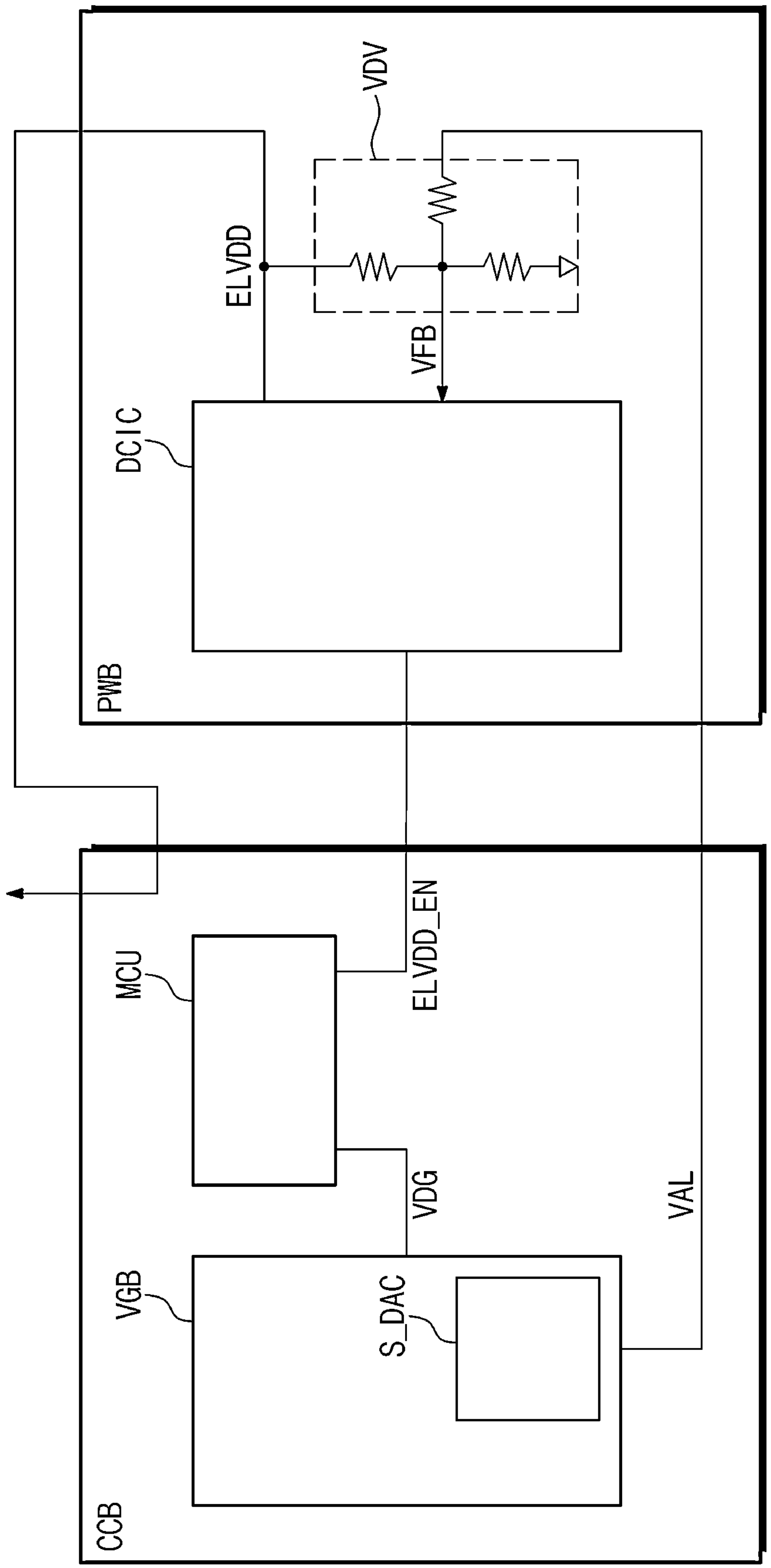
Figure 6:
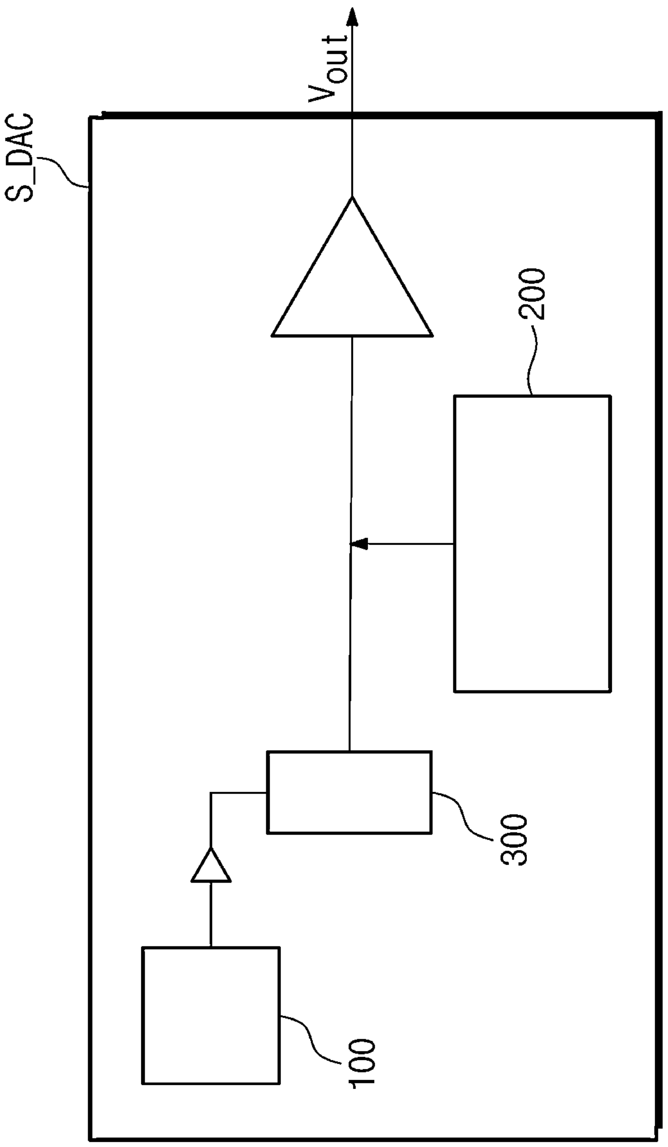
FIG. 6 illustrates a block diagram showing a digital-analog converter according to an embodiment of the invention.

FIGS. 5A and 5B illustrate block diagrams showing a control circuit board according to an embodiment of the invention. FIG. 6 illustrates a block diagram showing a digital-analog converter according to an embodiment of the invention.

Referring to FIG. 5A, in an embodiment, the control circuit board CCB may include a controller MCU, a voltage generator VGB, and a voltage converter DCIC. Referring to FIG. 5B, in an alternative embodiment, the control circuit board CCB may include a controller MCU and a voltage generator VGB, and a power board PWB, which is a circuit board separately divided from the control circuit board CCB, may include a voltage converter DCIC. In an embodiment shown in FIG. 5B, a first power voltage ELVDD generated from the voltage converter DCIC may be provided through the control circuit board CCB to the display panel (see DP of FIG. 3).

The control circuit board CCB may output the first power voltage ELVDD (referred to hereinafter as a power voltage) that is variable in real time based on a video signal RGB.

The controller MCU may receive the video signal RGB from an outside. The video signal RGB may include information about an image that is output to the display panel (see DP of FIG. 3). In an embodiment, for example, the video signal RGB may include information about gray scale. The following will describe that an image includes the video signal RGB.

The controller MCU may determine a digital-type first power voltage VDG. Based on an image, the controller MCU may determine a magnitude of the first power voltage VDG. In an embodiment, for example, the controller MCU may receive and analyze information of an image that is variable in real time, and based on the analyzed information, may determine the first power voltage VDG for driving the display panel DP. The first power voltage VDG may be variable in real time in accordance with an image that is changed in real time. The controller MCU may determine the first power voltage VDG that is variable in real time based on an image.

In an embodiment, for example, the controller MCU may analyze an image to generate information of gray scale for the image. Based on the gray scale for the image, the controller MCU may determine the first power voltage VDG for driving the display panel DP. The controller MCU may provide the voltage generator VGB with the determined digital-type first power voltage VDG. In an embodiment, the first power voltage VDG may be transmitted from the controller MCU through an I2C (inter-integrated circuit) to the voltage generator VGB. In an embodiment, for example, the first power voltage VDG may be transmitted as an 8-bit digital signal, and based on the 8-bit digital signal, a second power voltage VAL may be determined as an analog voltage in a range of about 0 V to about 3.3 V through a digital-analog converter S_DAC.

Based on the first power voltage VDG that is received as a digital type, the voltage generator VGB may generate the analog-type second power voltage VAL.

In an embodiment, for example, the voltage generator VGB may include the digital-analog converter S_DAC that converts the digital-type first power voltage VDG received from the controller MCU into the analog-type second power voltage VAL.

The digital-analog converter S_DAC may generate the second power voltage VAL that is determined within a certain voltage range. The certain voltage range may correspond to an arbitrarily set range. The second power voltage VAL may correspond to an analog voltage in proportion to the digital-type first power voltage VDG determined based on an image.

The certain voltage range may be, for example, from 0 V to about 3.3 V. Depending on the first power voltage VDG of a digital signal based on an image, the second power voltage VAL may be determined within a range of about 0 V to about 3.3 V.

The voltage generator VGB may provide the voltage converter DCIC with the analog-type second power voltage VAL.

Based on the second power voltage VAL, the voltage converter DCIC may output a power voltage ELVDD provided to the display panel DP. The power voltage ELVDD may be referred to hereinafter as an output power voltage. The output power voltage ELVDD may be variable in real time based on the second power voltage VAL.

Based on the received second power voltage VAL that is variably received in accordance with an image, the voltage converter DCIC may generate and provide the output power voltage ELVDD to the display panel DP. Therefore, the display device (see DD of FIG. 1) according to an embodiment of the invention may allow a magnitude of the power voltage ELVDD provided to the display panel DP to be variable based on an image. Accordingly, in an embodiment of the invention, a magnitude of the power voltage ELVDD may be variable in real time based on an image, and undesired power consumption may be reduced.

In an embodiment, the second power voltage VAL may be determined within a range of about 0 V to about 3.3 V. The output power voltage ELVDD may be determined as a voltage in a range of about 12 V to about 28 V. The voltage converter DCIC may boost the second power voltage VAL to be in a range of the output the power voltage ELVDD used for driving the display panel DP. In an embodiment, for example, based on the second power voltage VAL in a range of about 0 V to about 3.3 V, the output power voltage ELVDD may be determined to have a magnitude in a range of about 12 V to about 28 V. Table 1 below lists the second power voltage VAL and the output power voltage ELVDD.

TABLE 1

| Second power voltage (VAL) | Output power voltage (ELVDD) |
|---|---|
| 3.3 (V) | 11.19 (V) |
| 3.2 (V) | 11.69 (V) |
| 3.1 (V) | 12.19 (V) |
| 3 (V) | 12.69 (V) |
| — | — |
| 0.3 (V) | 26.19 (V) |
| 0.2 (V) | 26.69 (V) |
| 0.1 (V) | 27.19 (V) |
| 0 | 27.69 (V) |

In an embodiment, the control circuit board CCB may include a voltage distribution circuit VDV. The voltage distribution circuit VDV may be electrically connected to the voltage converter DCIC. The voltage distribution circuit VDV may receive the analog-type second power voltage VAL to calculate the output power voltage ELVDD. The voltage distribution circuit VDV may include, for example, a plurality of resistors. The voltage distribution circuit VDV may use a voltage distribution manner to calculate the output power voltage ELVDD from the second power voltage VAL.

The voltage converter DCIC may receive a feedback voltage VFB. The feedback voltage VFB may have a constant voltage. Based on the received second power voltage VAL, the voltage distribution circuit VDV may calculate the output power voltage ELVDD to maintain the constant feedback voltage VFB. In an embodiment, for example, a magnitude of the output power voltage ELVDD may be in inverse proportion to that of the second power voltage VAL. In Table 1, it may be shown that the output power voltage ELVDD is about 11.19 V when the second power voltage VAL is about 3.3 V, and that the output power voltage ELVDD is about 27.19 V when the second power voltage VAL is about 0.1 V. In this case, the feedback voltage VFB may be about 0.8 V. Table 1 is provided by way of example only, and any ranges of the feedback voltage VFB, the second power voltage VAL, and the output power voltage ELVDD are not limited thereto.

In an embodiment, the controller MCU may determine on/off of the power voltage ELVDD. In an embodiment, for example, the controller MCU may provide the voltage converter DCIC with an on/off signal ELVDD_EN. The controller MCU may provide the voltage converter DCIC with the on/off signal ELVDD_EN to control the voltage converter DCIC to determine whether or not to generate the power voltage ELVDD. In an embodiment, for example, when the voltage converter DCIC is on state based on the on/off signal ELVDD_EN, the voltage converter DCIC may generate the power voltage ELVDD, and when the voltage converter DCIC is off state based on the on/off signal ELVDD_EN, the voltage converter DCIC may not generate the power voltage ELVDD.

Referring to FIG. 6, an embodiment of the digital-analog converter S_DAC may include a voltage range setting part 100, a conversion part 200, and a maximum voltage determination part 300.

The voltage range setting part 100 may set a voltage range of the second power voltage VAL. The second power voltage VAL may be determined based on an image within a voltage range that is set in the voltage range setting part 100. The voltage range setting part 100 may set a maximum voltage magnitude. In an embodiment, for example, the maximum voltage magnitude may be determined as one selected from about 1.8 V, about 3.3 V, and about 4.8 V. When the maximum voltage magnitude is about 3.3 V, the voltage range may be determined as about 0 V to about 3.3 V. In an embodiment, the voltage range may be arbitrarily determined by the voltage range setting part 100. The maximum voltage determination part 300 may specify a maximum voltage in accordance with the arbitrarily determined voltage range. Alternatively, the maximum voltage determination part 300 may be omitted.

TABLE 2

| Voltage range setting unit (decimal number) | Maximum voltage (V) |
|---|---|
| 1 | 1.8 |
| 2 | 1.9 |
| — | — |
| 15 | 3.2 |
| 16 | 3.3 |
| 17 | 3.4 |
| — | — |
| 30 | 4.7 |
| 31 | 4.8 |

Table 2 shows maximum voltage ranges determined in the voltage range setting part 100. In Table 2, a maximum voltage may be determined based on a voltage range setting unit value that is determined based on the digital-type first power voltage (see VDG of FIG. 5A). When the number 16 is set as the voltage range setting unit value, the maximum voltage may be determined as about 3.3 V. Based on the voltage range, the voltage range setting part 100 may determine a variation in voltage. The variation in voltage may correspond to a voltage variation that is changed at every step in accordance with gray scale of an image within the voltage range. The variation in voltage may be constant. In an embodiment, for example, when the voltage range is about 0 V to about 1.8 V, the variation in voltage may be determined as about 7 millivolts (mV), and when the voltage range is about 0 V to about 3.3 V, the variation in voltage may be determined as about 12.9 mV.

Based on a digital signal of power voltage VDG, the conversion part 200 may generate an analog-type second power voltage VAL within the voltage range. In an embodiment, for example, the conversion part 200 may convert the digital-type first power voltage VDG, which is determined based on an image, into the analog-type second power voltage VAL. In the conversion part 200, the first power voltage VDG may be transmitted in real time through an I2C (inter-integrated circuit), and then may be converted through the digital-analog converter S_DAC into the second power voltage VAL having an analog voltage in a range of about 0 V to about 3.3 V.

Table 3 lists correspondence between the first power voltage (see VDG of FIG. 5A) corresponding to gray scale of an image and the analog-type second power voltage VAL. The second power voltage VAL is set to be in a voltage range of about 0 V to about 3.3 V.

TABLE 3

| Digital-type first power voltage (VDG) | Analog-type second power voltage (VAL) |
|---|---|
| 0 | 0.000 |
| 1 | 0.0129 |
| 2 | 0.0258 |
| — | — |
| 221 | 2.8488 |
| 222 | 2.8617 |
| — | — |
| 254 | 3.2742 |
| 255 | 3.2871 |

In Table 3, it may be shown that about 12.9 mV is given as a variation in voltage of one step in gray scale from 0 to 255. For example, about 12.9 mV is given as a difference between the second power voltage VAL in accordance with the digital signal VDG of 221 and the second power voltage VAL corresponding to the digital signal VDG of 222. In an embodiment, based on the first power voltage VDG of the digital signal of 222, the conversion part 200 may generate the analog-type second power voltage VAL of about 2.8617 V. Based on the digital signal VDG that is variable in real time in accordance with gray scale of an image, the conversion part 200 may cause the second power voltage VAL to vary in real time. For example, in a range of about 0 V to about 3.3 V, the second power voltage VAL may be output in real time in accordance with the digital signal VDG that is input based on an image. Table 3 merely shows one example.

Figure 7:
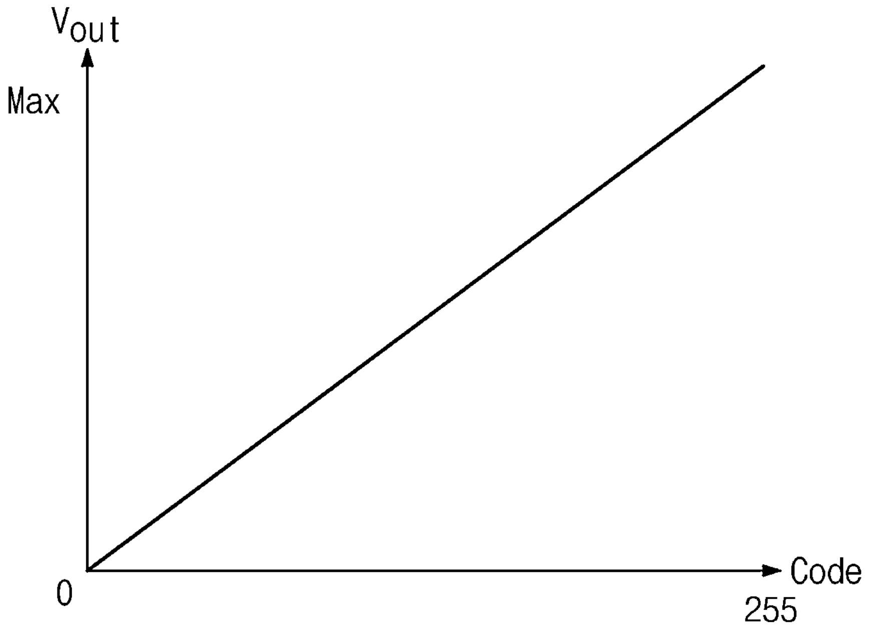
FIG. 7 illustrates a graph showing a variation in gray scale and a variation in output of power voltage according to an embodiment of the invention.

FIG. 7 illustrates a graph showing a variation in gray scale and a variation in output Vout of the second power voltage (see VAL of FIG. 5A) according to an embodiment of the invention.

Referring to the graph of FIG. 7, a magnitude of power voltage Vout that is output in an analog type in the digital-analog converter S_DAC may be in proportion to a magnitude of gray scale Code of an image. For example, a magnitude of gray scale for output of an image in a display panel may be in proportion to a magnitude of analog-type power voltage Vout that is output in the conversion part (e.g., the conversion part 200 of FIG. 6). Thus, the higher gray scale Code of an image, the greater magnitude of the power voltage Vout as described above with reference to Table 3.

Figure 8:
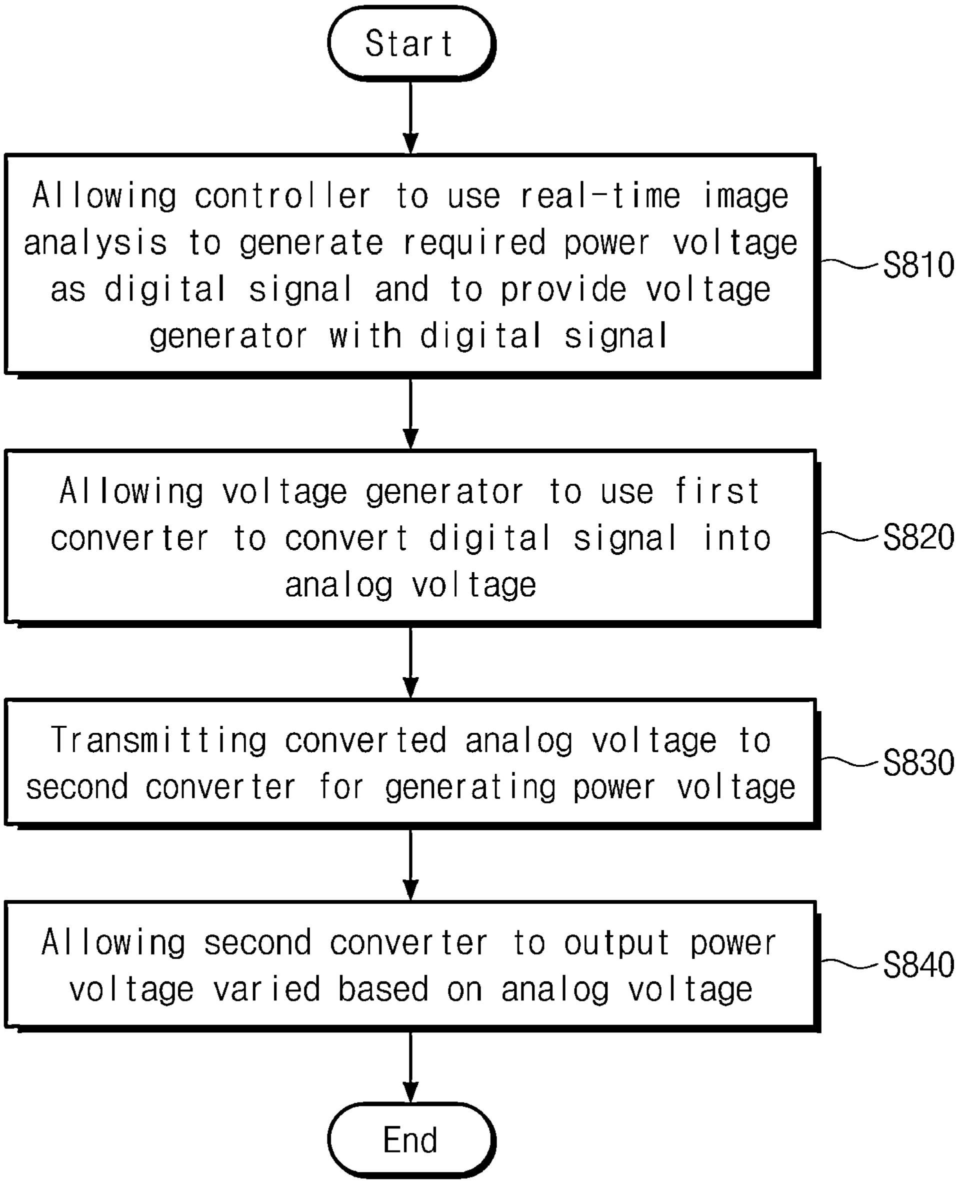
FIG. 8 illustrates a flow chart showing a power voltage output method of a display device according to an embodiment of the invention.

FIG. 8 illustrates a flow chart showing a power voltage output method of a display device according to an embodiment of the invention. Hereinafter, an embodiment of the power voltage output method of a display device will be describe in detail with reference to FIG. 8 together with FIGS. 5 and 6.

In an embodiment, as shown in FIG. 8, the controller MCU may use a real-time image analysis to generate a power voltage to be used for driving a display panel of the display device as a digital signal VDG, and may provide the voltage generator VGB with the digital signal VDG (S810).

The voltage generator VGB may use a first converter S_DAC to convert the digital signal VDG into an analog voltage (S820). The first converter S_DAC may be a digital-analog converter. The analog voltage may be the analog-type second power voltage (see VAL of FIG. 5A).

The voltage generator VGB may transmit the analog voltage VAL to a second converter that generates the power voltage ELVDD (S830). In an embodiment, the second converter may be a direct current-to-direct current (DC-DC) converter. The second converter may be disposed on the voltage converter DCIC.

The second converter of the voltage converter DCIC may output the power voltage ELVDD that is variable based on the analog voltage VAL (S840). In an embodiment, the power voltage ELVDD may be varied in real time by the analog voltage VAL, and then may be provided to the display panel DP.

In a display device according to an embodiment of the invention, a power voltage may be varied in real time based on an input image, and power consumption may be reduced.

In a display device according to an embodiment of the invention, a magnitude of an analog-type power voltage generated from a voltage generator may be varied in real time based on a magnitude of a digital-type power voltage which is varied based on an input image to be used for a display panel.

In a display device according to an embodiment of the invention, a power voltage with desired magnitude may be output in real time by using a voltage generator including a digital-analog converter that receives a digital-type information about power voltage varied based on an input image to thereby convert the digital-type information into an analog-type voltage.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel which displays an image;

a control circuit board connected to the display panel; and a power board separated from the control circuit board, wherein the control circuit board includes:

a controller which analyzes the image in real time and determines in real time a digital-type power voltage based on the image; and a voltage generator which generates an analog-type power voltage based on the digital-type power voltage received from the controller, wherein the voltage generator includes a digital-analog converter which converts the digital-type power voltage into the analog-type power voltage and outputs the analog-type power voltage, wherein the digital-analog converter comprises a voltage range setting part configured to set upper and lower limit voltages defining a voltage range in which the analog-type power voltage is determined, and a conversion part configured to generate and output, to the power board, a single analog-type power voltage constrained to the set voltage range, wherein the power board includes a voltage converter which generates an output power voltage based on the analog-type power voltage received from the voltage generator, wherein the output power voltage is provided through the control circuit board to the display panel, the output power voltage comprising a panel power supply voltage, and wherein the controller determines the digital-type power voltage in real time based on gray scale information generated from the image, wherein the digital signal of the digital-type power voltage is varied in real time based on gray scale for the image, and wherein the conversion part generates the analog-type power voltage which is varied in real time based on the digital signal of the digital-type power voltage which is varied in real time.

2. The display device of claim 1, wherein the control circuit board outputs the output power voltage varied in real time based on the image and applies the output power voltage to the display panel.

3. The display device of claim 1, wherein the voltage converter uses a voltage distribution manner to generate the output power voltage based on the analog-type power voltage.

4. The display device of claim 1, wherein the voltage range setting part determines a voltage variation of the analog-type power voltage within the voltage range to be varied in response to a variation in one step of gray scale for the image, wherein the voltage variation has a constant value.

5. The display device of claim 1, wherein a magnitude of the gray scale for the image is in proportion to a magnitude of the analog-type power voltage which is output from the conversion part.

6. The display device of claim 1, wherein the controller determines the digital-type power voltage based on gray scale for the image.

7. The display device of claim 6, wherein a magnitude of the analog-type power voltage is in proportion to a magnitude of the gray scale.

8. A display device, comprising:

a display panel which displays an image varied in real time;

a control circuit board connected to the display panel; and a power board separated from the control circuit board, wherein the control circuit board includes:

a controller which analyzes information of the image in real time and determines in real time a digital-type power voltage based on gray scale for the image; and a voltage generator which generates an analog-type power voltage based on the digital-type power voltage received from the controller, wherein the voltage generator includes a digital-analog converter which converts a digital signal of the digital-type power voltage into the analog-type power voltage, wherein the power board includes a voltage converter which generates an output power voltage based on the analog-type power voltage received from the voltage generator, wherein the output power voltage is provided through the control circuit board to the display panel, and wherein the digital-analog converter comprises a voltage range setting part configured to set upper and lower limit voltages defining a voltage range in which the analog-type power voltage is determined, and a conversion part configured to generate and output, to the power board, a single analog-type power voltage constrained to the set voltage range, wherein the output power voltage comprises a panel power supply voltage ELVDD, wherein the controller determines the digital-type power voltage in real time based on gray scale information generated from the image, wherein a magnitude of the gray scale for the image is in proportion to a magnitude of the analog-type power voltage which is output from the conversion part.

9. The display device of claim 8, wherein the control circuit board further includes a voltage distribution circuit connected to the voltage converter, wherein the voltage distribution circuit receives the analog-type power voltage, calculates a distribution voltage for generating the output power voltage and transmits a calculated distribution voltage to the voltage converter.

10. The display device of claim 9, wherein the voltage converter generates the output power voltage varied in real time based on the analog-type power voltage and outputs the output power voltage to the display panel.

11. The display device of claim 10, wherein a magnitude of the output power voltage is inverse proportion to a magnitude of the analog-type power voltage.

12. The display device of claim 8, wherein a maximum voltage magnitude of the analog-type power voltage is determined as one selected from about 1.8 V, about 3.3 V, and about 4.8 V.

13. The display device of claim 8, wherein the voltage range setting part determines a voltage variation of the analog-type power voltage within the voltage range to be varied in response to a variation in one step of the gray scale for the image, wherein the voltage variation has a constant value.

14. The display device of claim 8, wherein the controller is connected to the voltage converter and controls a generation of the output power voltage.

15. The display device of claim 8, wherein a magnitude of the analog-type power voltage which is output from the digital-analog converter is in proportion to a magnitude of the gray scale for the image.

16. An electronic apparatus comprising a display device providing an image, wherein the display device comprises:

a display panel which displays the image;

a control circuit board connected to the display panel; and a power board separated from the control circuit board, wherein the control circuit board includes:

a controller which analyzes the image in real time and determines in real time a digital-type power voltage based on the image; and a voltage generator which generates an analog-type power voltage based on the digital-type power voltage received from the controller, wherein the voltage generator includes a digital-analog converter which converts the digital-type power voltage into the analog-type power voltage and outputs the analog-type power voltage, wherein the digital-analog converter comprises a voltage range setting part configured to set upper and lower limit voltages defining a voltage range in which the analog-type power voltage is determined, and a conversion part configured to generate and output, to the power board, a single analog-type power voltage constrained to the set voltage range, wherein the power board includes a voltage converter which generates an output power voltage based on the analog-type power voltage received from the voltage generator, wherein the output power voltage is provided through the control circuit board to the display panel, the output power voltage comprising a panel power supply voltage ELVDD, and wherein the controller determines the digital-type power voltage in real time based on gray scale information generated from the image, wherein the digital signal of the digital-type power voltage is varied in real time based on gray scale for the image, and wherein the conversion part generates the analog-type power voltage which is varied in real time based on the digital signal of the digital-type power voltage which is varied in real time.

* * * * *